(12) United States Patent
Zaki et al.

(10) Patent No.: US 8,204,734 B2
(45) Date of Patent: Jun. 19, 2012

(54) MULTI-PLATFORM SOFTWARE APPLICATION SIMULATION SYSTEMS AND METHODS

(75) Inventors: Syed Mohasin Zaki, Chennai (IN); Padmakumar Rajan, Chennai (IN); Vijay Senthil Angayarkanni, Chennai (IN); Arjun Baskaran, Chennai (IN)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 702 days.

(21) Appl. No.: 12/345,031

(22) Filed: Dec. 29, 2008

(65) Prior Publication Data
US 2010/0169072 A1 Jul. 1, 2010

(51) Int. Cl.
*G06F 9/45* (2006.01)
(52) U.S. Cl. ............................................. 703/22; 703/13
(58) Field of Classification Search .............. 703/20–24, 703/13; 463/43; 717/125, 129, 131, 100; 716/105; 712/29; 700/284; 707/102; 434/29; 345/1.3; 704/3
See application file for complete search history.

(56) References Cited

U.S. PATENT DOCUMENTS

| | | | | |
|---|---|---|---|---|
| 6,175,948 B1 * | 1/2001 | Miller et al. | .................. | 716/105 |
| 6,232,932 B1 * | 5/2001 | Thorner | ......................... | 345/1.3 |
| 6,317,705 B1 * | 11/2001 | Packer | ............................. | 703/24 |
| 7,908,592 B2 * | 3/2011 | Tatsuoka et al. | ............. | 717/131 |
| 2002/0059054 A1 * | 5/2002 | Bade et al. | ....................... | 703/20 |
| 2004/0038185 A1 * | 2/2004 | Ball et al. | ......................... | 434/29 |
| 2005/0130744 A1 * | 6/2005 | Eck et al. | ......................... | 463/43 |
| 2008/0109793 A1 * | 5/2008 | Buettner | ....................... | 717/129 |
| 2008/0125917 A1 * | 5/2008 | Walker et al. | .................. | 700/284 |
| 2008/0177522 A1 * | 7/2008 | Bolding et al. | ................. | 703/13 |
| 2008/0178143 A1 * | 7/2008 | Dougan et al. | ............... | 717/100 |
| 2008/0178155 A1 * | 7/2008 | Gogh et al. | .................... | 717/125 |
| 2009/0070552 A1 * | 3/2009 | Kanstein et al. | ................ | 712/29 |
| 2009/0099836 A1 * | 4/2009 | Jacobsen et al. | .................. | 704/3 |
| 2009/0254580 A1 * | 10/2009 | Laurion | ........................ | 707/102 |

OTHER PUBLICATIONS

"Beta iPhone SDK and Xcode 3.1 Developer Tools for Mac OS X v10.5", *iPhone SDK—Download Notes*, as accessed on Dec. 11, 2008.
"How to Use Apple SDK to Build 1.1.4 Apps", Mar. 26, 2008.

* cited by examiner

*Primary Examiner* — Kandasamy Thangavelu

(57) ABSTRACT

An exemplary system includes a development subsystem configured to facilitate development of a software application and a simulation subsystem selectively and communicatively coupled to the development subsystem. The simulation subsystem is configured to emulate a plurality of processing device platforms, receive data representative of a selection of at least one of the plurality of processing device platforms, and simulate an execution of the software application by one or more processing devices associated with the at least one selected processing device platform.

24 Claims, 12 Drawing Sheets

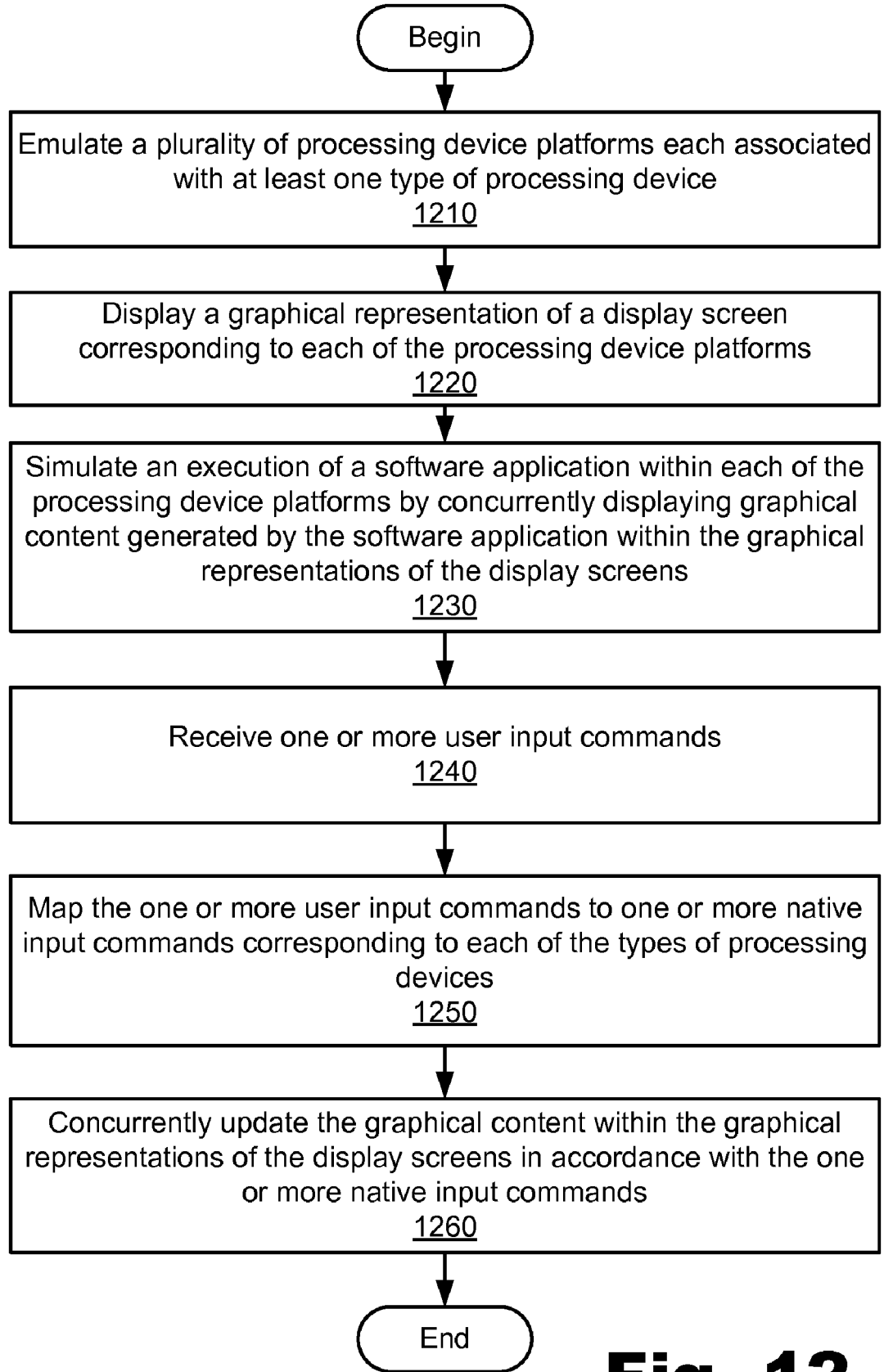

MULTI-PLATFORM SOFTWARE APPLICATION SIMULATION SYSTEMS AND METHODS

BACKGROUND INFORMATION

It is often desirable for a service provider or device manufacturer to facilitate third party software application development for the service provider's or device manufacturer's proprietary computing devices, operating systems, and/or platforms. To this end, the service provider may provide a software development kit ("SDK") to third party developers that includes one or more development and simulation tools. These tools may be configured to facilitate development and testing of software applications within a simulated environment of a particular computing device, operating system, and/or platform.

For example, an illustrative SDK may be configured to facilitate development and testing of a game application to be run or executed by a particular type of mobile phone. To this end, the SDK may include a simulation tool configured to simulate interaction of the game application with the mobile phone.

Unfortunately, conventional simulation tools suffer from several shortcomings. For example, conventional simulation tools are often designed to provide a simulation environment for a specific computing device platform (e.g., a particular mobile phone platform). Hence, these simulation tools may not be used to develop and simulate software applications to be deployed across a variety of different computing device platforms.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

FIG. 12 illustrates an exemplary method of simulating an execution of a software application within a plurality of processing device platforms according to principles described herein.

DETAILED DESCRIPTION OF PREFERRED EMBODIMENTS

Systems and methods of simulating a software application configured to be executed by one or more processing devices associated with at least one processing device platform are described herein.

An exemplary system includes a storage facility configured to maintain compiled source code (e.g., object code) representative of a software application, an emulator facility configured to emulate a plurality of processing device platforms, and a simulator facility configured to simulate an execution of the software application by one or more processing devices associated with at least one of the processing device platforms.

Another exemplary system includes a development subsystem configured to facilitate development of a software application and a simulation subsystem selectively and communicatively coupled to the development subsystem. The simulation subsystem is configured to emulate a plurality of processing device platforms, receive data representative of a selection of at least one of the plurality of processing device platforms, and simulate an execution of the software application by one or more processing devices associated with the at least one selected processing device platform.

An exemplary method includes emulating a plurality of processing devices, receiving data representative of a selection of at least one of the plurality of processing device platforms, and simulating an execution of a software application by one or more processing devices associated with the at least one selected processing device platform.

An exemplary computer-readable medium includes instructions configured to direct a computer to receive data representative of a selection of at least one of a plurality of processing device platforms and simulate an execution of a software application by one or more processing devices associated with the at least one selected processing device platform.

The systems, methods, and computer-readable mediums described herein may facilitate development and simulation of a software application before the application is uploaded to a processing device for execution. A developer may selectively simulate the software application within a plurality of different processing device platforms in order to more effectively and efficiently deploy the software application across a plurality of processing device platforms. The systems, methods, and computer-readable mediums described herein may further enable a service provider or manufacturer to provide and manage third party software application development for proprietary processing devices.

Figure 1:
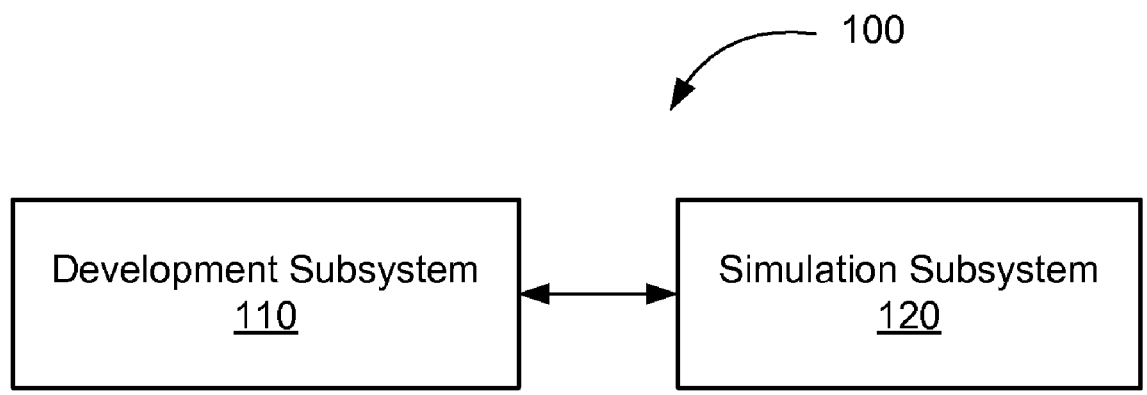
FIG. 1 illustrates an exemplary software application development system according to principles described herein.

FIG. 1 illustrates an exemplary software application development system 100 (or simply "system 100"). As shown in FIG. 1, system 100 may include a development subsystem 110 and a simulation subsystem 120 configured to communicate with one another. As will be described in more detail below, development subsystem 110 and simulation subsystem 120 may facilitate development and simulation of one or more software applications (or simply "applications") configured to be executed by one or more platform-specific processing devices.

Simulation subsystem 120 and development subsystem 110 may communicate using any communication platforms and technologies suitable for transporting data, including known communication technologies, devices, media, and protocols supportive of remote or local data communications. Examples of such communication technologies, devices, media, and protocols include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), Evolution Data Optimized Protocol ("EVDO"), radio frequency ("RF") signaling technologies, signaling system seven ("SS7") technologies, Ethernet, in-band and out-of-band signaling technologies, Fiber-to-the-premises ("FTTP") technologies, Passive Optical Network ("PON") technologies, and other suitable communications networks and technologies.

In some examples, one or more components of system 100 may include any computer hardware and/or instructions (e.g., software programs including, but not limited to programming software (e.g., Microsoft Visual C, C++, Lua, HTML, Flash, OpenGL, etc.), simulation software, database software, web browsing software, etc.) or combinations of software and hardware, configured to perform the processes described herein. In particular, it should be understood that components of system 100 may be implemented on one physical computing device or may be implemented on more than one physical computing device. Accordingly, system 100 may include any one of a number of computing devices, and may employ any of a number of computer operating systems.

The processes described herein may be implemented at least in part as computer-executable instructions, i.e., instructions executable by one or more computing devices, tangibly embodied in a computer-readable medium. In general, a processor (e.g., a microprocessor) receives instructions, from a computer-readable medium (e.g., a memory, etc.), and executes those instructions, thereby performing one or more processes, including one or more of the processes described herein. Such instructions may be stored and transmitted using a variety of known computer-readable media.

A computer-readable medium (also referred to as a processor-readable medium) includes any medium that participates in providing data (e.g., instructions) that may be read by a computer (e.g., by a processor of a computer). Such a medium may take many forms, including, but not limited to, non-volatile media and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

In some examples, development subsystem 110 and simulation subsystem 120 may communicate via one or more networks, including, but not limited to, wireless networks, broadband networks, closed media networks, cable networks, satellite networks, the Internet, intranets, local area networks, public networks, private networks, optical fiber networks, and/or any other networks capable of carrying data and communications signals between development subsystem 110 and simulation subsystem 120.

Figure 2:
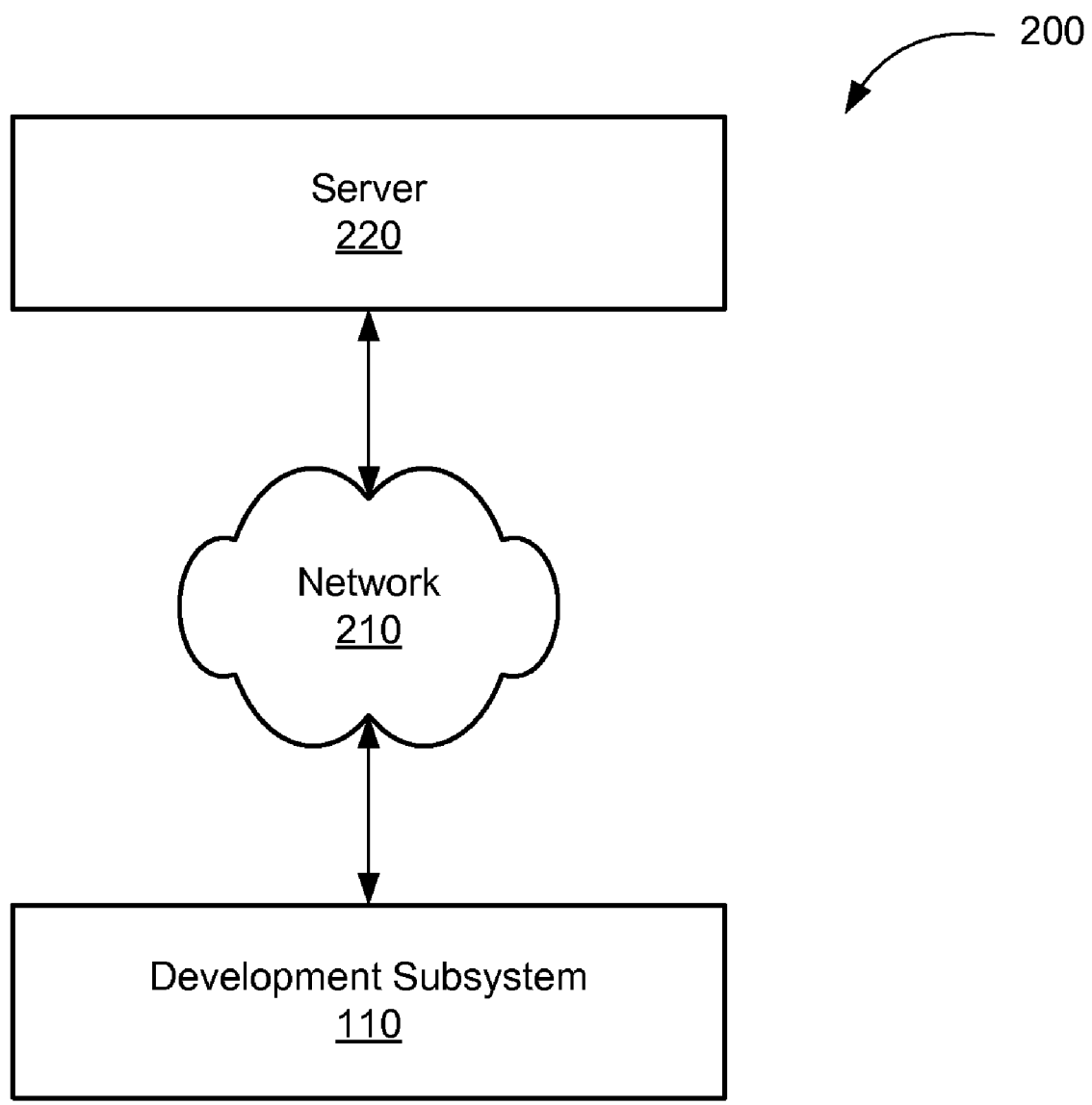
FIG. 2 shows an exemplary implementation of the system of FIG. 1 according to principles described herein.

FIG. 2 shows an exemplary implementation 200 of system 100 wherein development subsystem 110 and simulation subsystem 120 are communicatively coupled via a network 210. In implementation 200, simulation subsystem 120 may include or be implemented within at least one server 220. Network 210 may include one or more networks, including, but not limited to, any of the networks listed above. Communications between development subsystem 110 and server 210 may be transported using any one of above-listed networks, or any combination or sub-combination of the above-listed networks.

Figure 3:
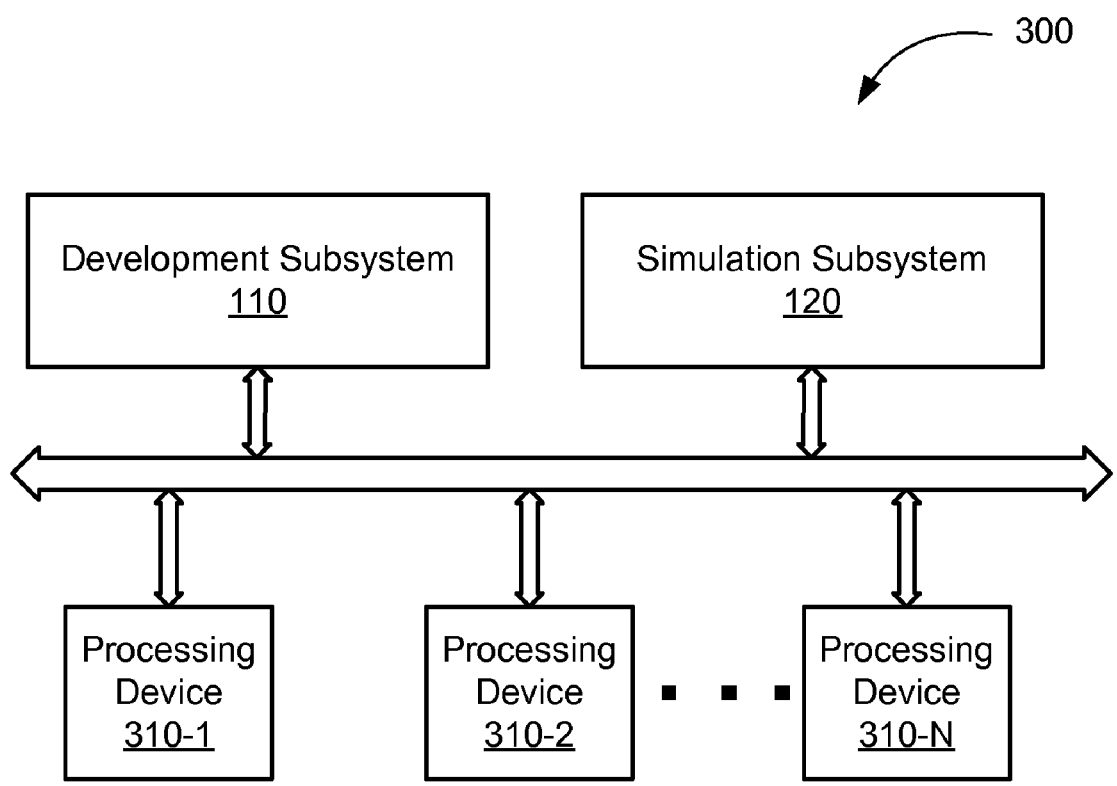
FIG. 3 illustrates an exemplary configuration wherein a plurality of platform-specific processing devices are communicatively coupled to development subsystem and simulation subsystem according to principles described herein.

As mentioned, software application development system 100 may be configured to facilitate development and simulation of one or more software applications configured to be executed by one or more platform-specific processing devices. FIG. 3 illustrates an exemplary configuration 300 wherein a plurality of platform-specific processing devices 310-1 through 310-N (collectively referred to herein as "processing devices 310") are communicatively coupled to development subsystem 110 and simulation subsystem 120. It will be recognized that processing devices 310 may alternatively be coupled only to one or neither of the development subsystem 110 and simulation subsystem 120 in some examples.

Each processing device 310 may include any device configured to execute a software application developed within system 100. For example, a processing device 310 may include, but is not limited to, a personal computing device (e.g., a desktop or laptop computer), a set-top box, a communication device (e.g., a phone device such as a Verizon Hub device), a media player, a wireless computing device, a wireless communication device (e.g., a mobile phone), a Global Positioning System ("GPS") device, a personal digital assistant, a content recording device (e.g., a camera, audio recorder, video camera), a television, a vehicular computing and/or communication device, a content-enabled device, a gaming device (e.g., a game console), and/or any other device configured to execute a software application.

Each processing device 310 shown in FIG. 3 may be platform-specific. In other words, each processing device 310 may be configured to operate within a distinct hardware and/or software framework. For example, processing device 310-1 may include a set-top box configured to operate within particular set-top box platform, processing device 310-2 may include a mobile phone configured to operate within a particular mobile phone platform, and processing device 310-N may include a gaming device configured to operate within a particular gaming device platform.

In some examples, multiple types of processing devices 310 may be associated with a single processing device platform. For example, a media player and a mobile phone may each be associated with the same processing device platform.

In some examples, each processing device platform may be associated with a specific provider or manufacturer. For example, each processing device platform may be associated with a communications provider that offers various types of processing devices and/or communications services to its customers.

Development subsystem 110 and/or simulation subsystem 120 may be configured to support communication with processing devices 310 via multiple network platforms. For example, each processing device 310 may be associated with a distinct network platform.

Figure 4:
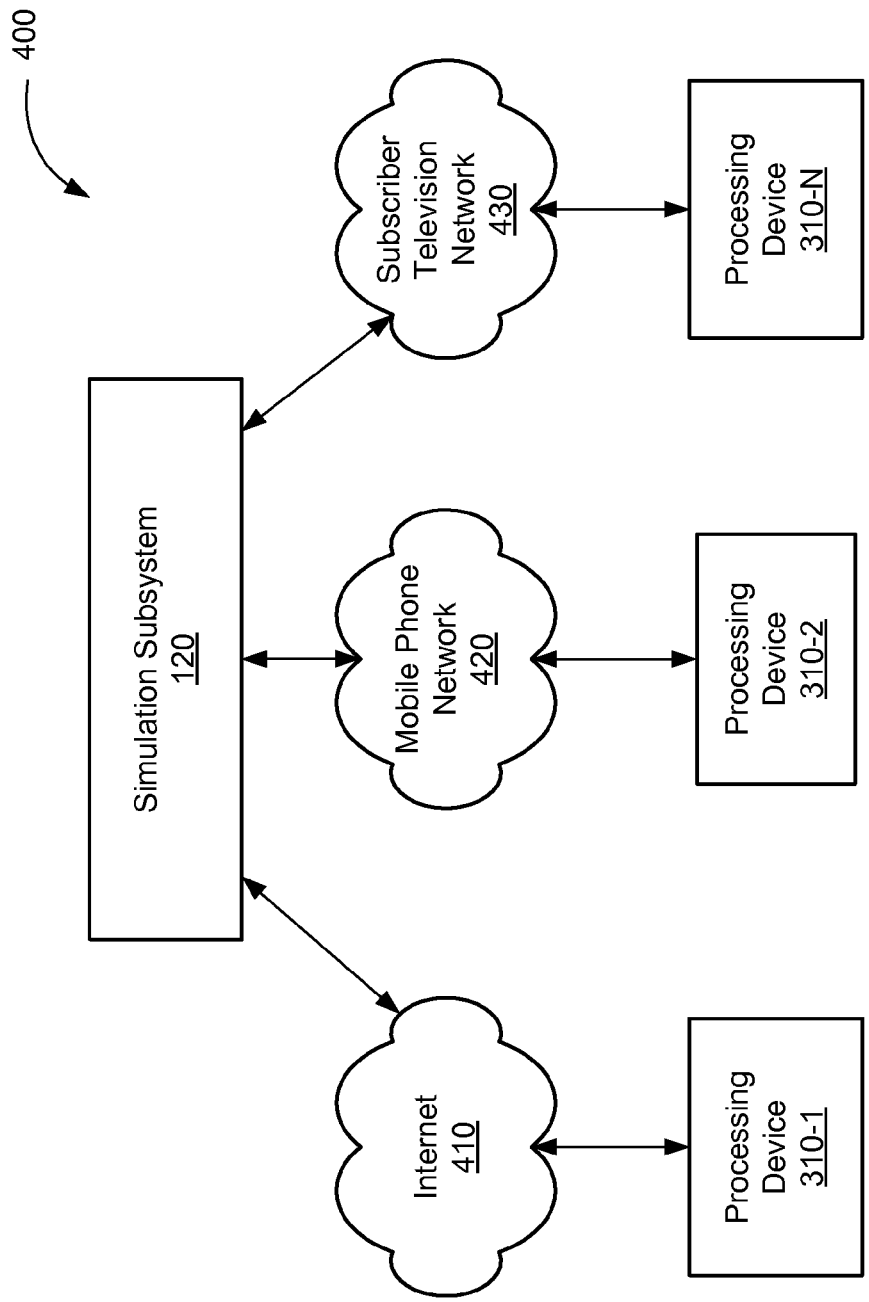
FIG. 4 shows an exemplary implementation wherein a plurality of processing devices is communicatively coupled to simulation subsystem via distinct network platforms according to principles described herein.

To illustrate, FIG. 4 shows an exemplary implementation 400 wherein each processing device 310-1 through 310-N is communicatively coupled to simulation subsystem 120 via distinct network platforms. Processing devices 310 may additionally or alternatively be coupled to development subsystem 110 in a similar manner.

For example, simulation subsystem 120 may be configured to communicate with processing device 310-1 (e.g., a personal computer) over the Internet 410, with processing device 310-2 (e.g., a mobile phone) over a mobile phone network 420, and/or with processing device 310-N (e.g., a set-top box) over a subscriber television network 430. It will be recognized that the Internet 410, mobile phone network 420, and subscriber television network 430 may be part of network 210 shown in FIG. 2. It will also be recognized that the networks shown in FIG. 4 are merely illustrative of the many different types of networks that may facilitate communication between simulation subsystem 120 and processing devices 310.

Figure 5:
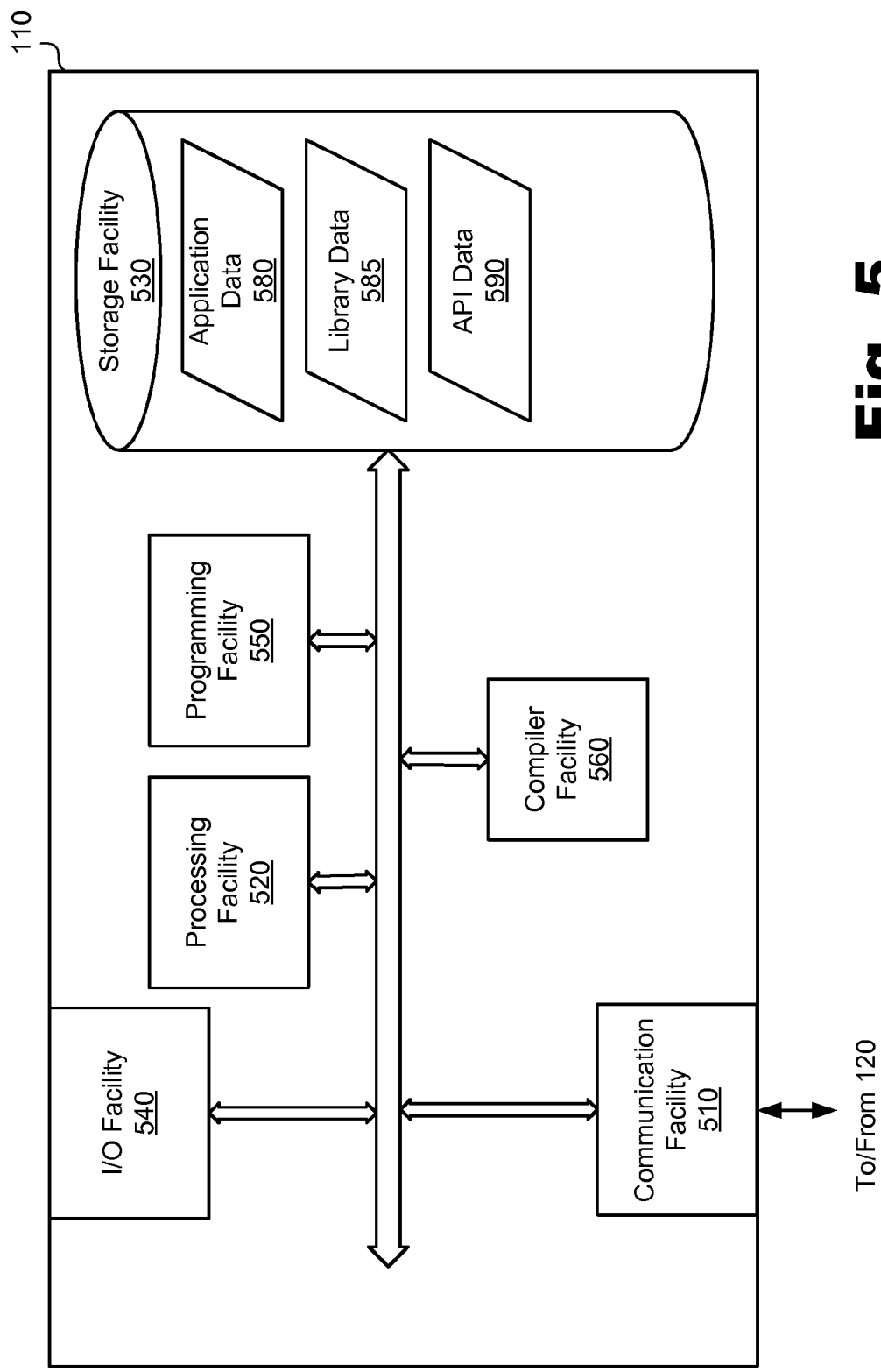
FIG. 5 illustrates components of an exemplary development subsystem according to principles described herein.

FIG. 5 illustrates components of an exemplary development subsystem 110. As shown in FIG. 5, development subsystem 110 may include a communication facility 510, processing facility 520, storage facility 530, input/output ("I/O") facility 540, programming facility 550, and compiler facility 560 communicatively connected to one another. The facilities 510-560 may be communicatively connected using any suitable technologies. Each of the facilities 510-560 may be implemented as hardware, computing instructions (e.g., software) tangibly embodied on a computer-readable medium, or a combination of hardware and computing instructions configured to perform one or more of the processes described herein. In certain embodiments, for example, programming facility 550, compiler facility 560, and/or one or more other facilities may be implemented as one or more software applications embodied on a computer-readable medium such as storage facility 530 and configured to direct processing facility 520 of the development subsystem 110 and/or any other processing facility (e.g., a processing facility of simulation subsystem 120) to execute one or more of the processes described herein.

Communication facility 510 may be configured to communicate with simulation subsystem 120 (e.g., directly or over network 210), including sending and receiving data representative of compiled software application data, data associated with compiled software application data, simulation commands, debugging commands, and/or other communications to/from simulation subsystem 120. Communication facility 510 may include any device, logic, and/or other technologies suitable for transmitting and receiving such data. Communication facility 510 may be configured to interface with any suitable communication media, protocols, formats, platforms, and networks, including any of those mentioned herein.

Processing facility 520 may be configured to execute and/or direct execution of operations of one or more components of the development subsystem 110. Processing facility 520 may direct execution of operations in accordance with computer-executable instructions such as may be stored in storage facility 530 or another computer-readable medium.

Storage facility 530 may include one or more data storage media, devices, or configurations and may employ any type, form, and combination of storage media. For example, the storage facility 530 may include, but is not limited to, a hard drive, network drive, flash drive, magnetic disc, optical disc, random access memory ("RAM"), dynamic RAM ("DRAM"), other non-volatile and/or volatile storage unit, or a combination or sub-combination thereof. Data may be temporarily and/or permanently stored in the storage facility 530.

Different types of data may be maintained within storage facility 530. For example, as shown in FIG. 5, software application data 580, library data 585, and application program interface ("API") data 590. It will be recognized that data stored within storage facility 530 may additionally or alternatively be stored within any other storage medium as may serve a particular application.

Software application data 580 may include any data associated with one or more software applications developed using development subsystem 110. For example, software application data 580 may include source code created by a developer within any suitable programming language. Software application data 580 may additionally or alternatively include compiled source code, documentation included within an SDK and/or otherwise provided by a service provider, and/or any other data as may serve a particular application.

Library data 585 may include data representative of one or more software application development libraries that may be used by a developer to develop one or more software applications specific to one or more processing devices 310. Library data 585 may be included within an SDK and/or otherwise provided by a service provider. In some examples, library data 585 may include API data 590 (e.g., precompiled source code for one or more APIs associated with one or more types of processing devices 310). The library data 585 may additionally include data and/or documentation facilitating the implementation, functionality, and/or logic of each of the APIs.

API data 590 may include data representative of one or more APIs associated with simulation subsystem 120 and/or one more types of processing devices 310. As described in more detail below, a developer may utilize one or more of these APIs to develop one or more software applications to be implemented by one or more types of processing devices 310.

In some examples, one or more APIs are common across various processing device platforms. One or more APIs may additionally or alternatively be specific to a particular processing device platform.

I/O facility 540 may be configured to receive user input and provide user output and may include any hardware, firmware, software, or combination thereof supportive of input and output capabilities. For example, I/O facility 540 may include one or more devices for capturing or otherwise receiving user input, including, but not limited to, a microphone, a keyboard or keypad, a touch screen component, a remote control, and/or receiver (e.g., an RF or infrared receiver).

I/O facility 540 may include one or more devices for presenting content for experiencing by a user, including, but not limited to, a graphics engine, a display, one or more display drivers, one or more audio speakers, and one or more audio drivers. Accordingly, I/O facility 540 may present content (e.g., display one or more graphical user interfaces ("GUIs")) for experiencing by the user.

Programming facility 550 may be configured to provide one or more tools for creating a software application. The tools may include or be provided using hardware, computer-readable instructions embodied on a computer-readable medium such as storage facility 530, or a combination of hardware and computer-readable instructions. In certain embodiments, programming facility 550 may be implemented as a software application embodied on a computer-readable medium such as storage facility 530 and configured to direct the processing facility 520 of the development subsystem 110 to execute one or more programming operations.

The tools may be configured to enable a developer to create, debug, format, modify, delete, annotate, access, retrieve, copy, move, send, request, receive, decrypt, and/or otherwise manage application data 580, library data 585, API data 590, and/or any other data as may serve a particular application.

In some examples, the one or more tools provided by programming facility 550 may include one or more application clients configured to facilitate creation of source code that defines a software application. Any suitable programming language may be used by programming facility 550 including, but not limited to, Microsoft Visual C, C++, Lua, HTML, Flash, and OpenGL.

Additionally or alternatively, the one or more tools provided by programming facility 550 may include one or more tools that aid in the development of software applications. Such tools may be referred to as "binaries" and may include a bitmap organizer configured to facilitate consolidation and organization of images and other bitmaps useful for a particular software application, a debugging tool, and/or any other tool as may serve a particular application.

Compiler facility 560 may be configured to perform one or more compiling operations on source code developed using programming facility 550. Compiler facility 560 may include hardware, computer-readable instructions embodied on a computer-readable medium such as storage facility 530 (e.g., one or more compiler engines), or a combination of hardware and computer-readable instructions. In certain embodiments, compiler facility 560 may be implemented as a software application embodied on a computer-readable medium such as storage facility 530 and configured to direct the processing facility 520 of the development subsystem 110 to execute one or more compilation operations described herein.

Compiler facility 560 may be configured to compile source code for execution within any suitable runtime environment. For example, compiler facility 560 may be used to compile source code representing a software application for execution by simulation subsystem 120 and/or one or more types of processing facilities 310. Compiled source code may be stored within storage facility 530, on a server (e.g., server 220), and/or within any other storage medium as may serve a particular application.

In some examples, compiler facility 560 may be configured to cross compile source code for execution by distinct types of subsystems and/or processing devices. When source code is cross compiled, multiple copies of the compiled source code may be generated, each being configured to be executed by a specific type of subsystem and/or processing device. For example, source code may be cross compiled to generate a first copy of the compiled source code for execution by simulation subsystem 120 and a second copy of the compiled source code for execution by a particular type of processing device 310 (e.g., a set-top box).

In some examples, cross-compilation of source code is not required for the code to be executable by multiple types of processing devices 310. For example, if source code is developed in Lua, the compiled source code may remain constant across different types of processing devices 310 and be interpreted in real-time by a Lua engine residing on the processing device 310.

Figure 6:
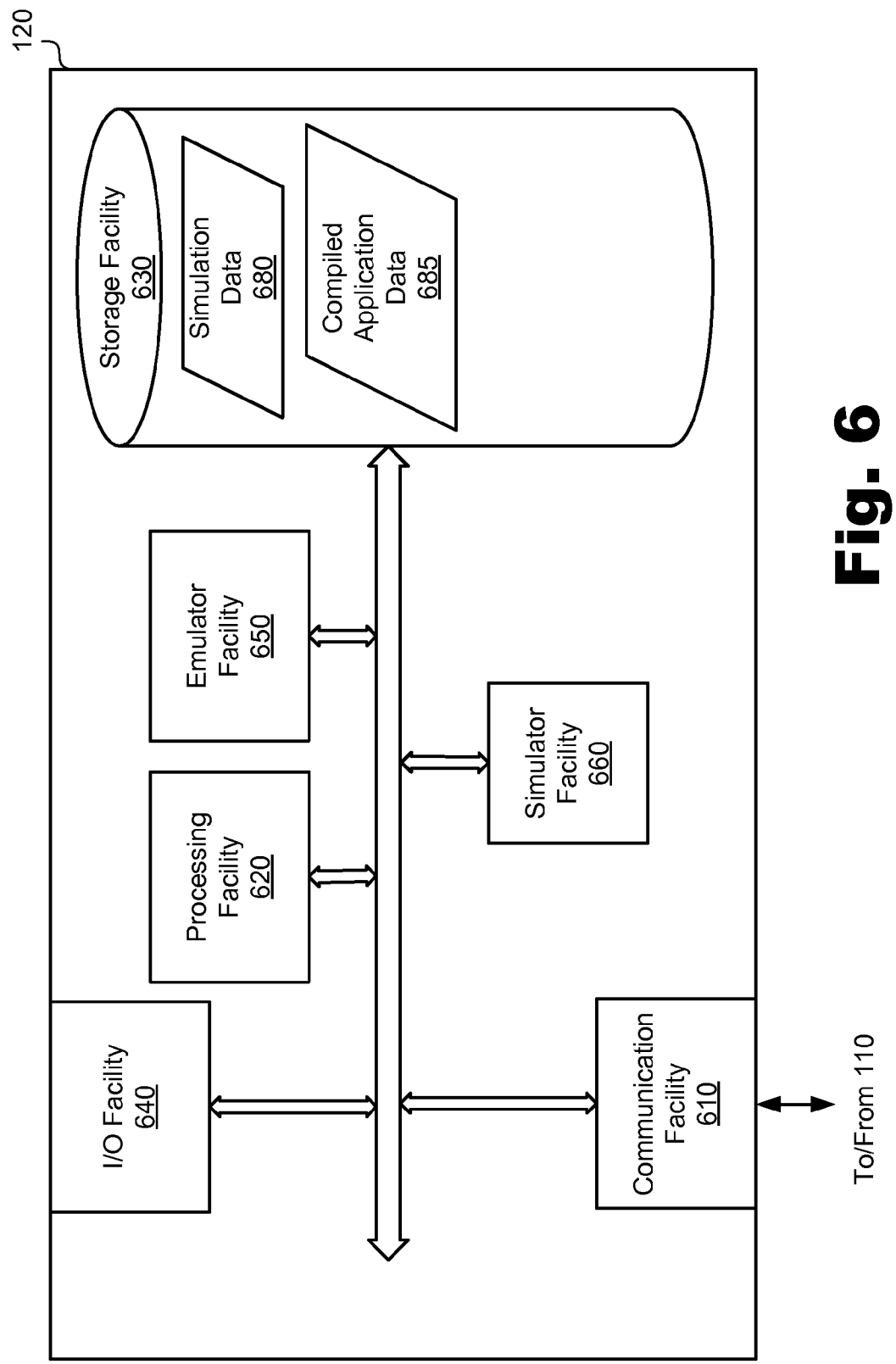
FIG. 6 illustrates components of an exemplary simulation subsystem according to principles described herein.

FIG. 6 illustrates components of an exemplary simulation subsystem 120. As shown in FIG. 6, simulation subsystem 120 may include a communication facility 610, processing facility 620, storage facility 630, input/output ("I/O") facility 640, emulator facility 650, and simulator facility 660 communicatively connected to one another. The facilities 610-660 may be communicatively connected using any suitable technologies. Each of the facilities 610-660 may be implemented as hardware, computing instructions (e.g., software) tangibly embodied on a computer-readable medium, or a combination of hardware and computing instructions configured to perform one or more of the processes described herein. In certain embodiments, for example, emulator facility 650, simulator facility 660, and/or one or more other facilities may be implemented as one or more software applications embodied on a computer-readable medium such as storage facility 630 and configured to direct processing facility 620 of the simulation subsystem 120 and/or any other processing facility (e.g., of development subsystem 110) to execute one or more of the processes described herein.

Communication facility 610 may be configured to communicate with development subsystem 110 (e.g., directly or over network 210), including sending and/or receiving data representative of compiled software application data, data associated with compiled software application data, simulation commands, debugging commands, and/or other communications to/from development subsystem 110. Communication facility 610 may include any device, logic, and/or other technologies suitable for transmitting and receiving such data. Communication facility 610 may be configured to interface with any suitable communication media, protocols, formats, platforms, and networks, including any of those mentioned herein.

Processing facility 620 may be configured to execute and/or direct execution of operations of one or more components of the simulation subsystem 120. Processing facility 620 may direct execution of operations in accordance with computer-executable instructions such as may be stored in storage facility 630 or another computer-readable medium.

Storage facility 630 may include one or more data storage media, devices, or configurations and may employ any type, form, and combination of storage media. For example, the storage facility 630 may include, but is not limited to, a hard drive, network drive, flash drive, magnetic disc, optical disc, RAM, DRAM, other non-volatile and/or volatile storage unit, or a combination or sub-combination thereof. Data may be temporarily and/or permanently stored in the storage facility 630.

Different types of data may be maintained within storage facility 630. For example, as shown in FIG. 6, simulation data 680 and compiled application data 685 may be maintained within storage facility 630. It will be recognized that data stored within storage facility 630 may additionally or alternatively be stored within any other storage medium as may serve a particular application.

Simulation data 680 may include any data associated with a simulation of one or more software applications as performed by simulation subsystem 120. Exemplary simulation data 680 includes, but is not limited to, output data resulting from one or more simulations, simulation parameters and/or other input data, and/or any other data as may suit a particular application.

Compiled application data 685 may include compiled source code representative of one or more software applications. The compiled application data 685 may be executed by simulation subsystem 120 to perform one or more application simulations described herein.

I/O facility 640 may be configured to receive user input and provide user output and may include any hardware, firmware, software, or combination thereof supportive of input and output capabilities. For example, I/O facility 640 may include one or more devices for capturing or otherwise receiving user input, including, but not limited to, a microphone, a keyboard or keypad, a mouse, a touch screen component, a remote control, and/or receiver (e.g., an RF or infrared receiver). Accordingly, a user of simulation subsystem 120 may input one or more commands to simulation subsystem 120 to simulate a response of a processing device 310 being emulated by simulation subsystem 120.

I/O facility 640 may include one or more devices for presenting content for experiencing by a user, including, but not limited to, a graphics engine, a display, one or more display drivers, one or more audio speakers, and one or more audio drivers. Accordingly, I/O facility 640 may present content (e.g., display one or more GUIs configured to emulate or replicate an environment of a processing device 310) for experiencing by the user.

Emulator facility 650 may be configured to emulate a processing device 310. As used herein, "emulation" of a processing device 310 refers to emulation of an environment, display, operation, function, and/or any other feature of a processing device 310. For example, emulator facility 650 may be configured to generate and display a graphical representation of a display screen associated with a processing device 310 (e.g., a television display screen associated with a set-top box) and/or one or more input devices (e.g., a remote control device) associated with the processing device 310.

In certain embodiments, emulator facility 650 may be implemented as a software application embodied on a computer-readable medium such as storage facility 630 and configured to direct the processing facility 620 of the simulation subsystem 120 to execute one or more emulation operations.

Simulator facility 660 may be configured to simulate execution of a software application by one or more processing devices 310. For example, simulator facility 660 may be configured to simulate execution of a game application or any other software application by a set-top box, mobile phone, gaming device, and/or any other processing device 310 as may serve a particular application.

In certain embodiments, simulator facility 660 may be implemented as a software application embodied on a computer-readable medium such as storage facility 630 and configured to direct the processing facility 620 of the simulation subsystem 120 to execute one or more simulation operations.

Various features, embodiments, and applications of system 100 will now be described. It will be recognized that the features, embodiments, and applications described herein are merely illustrative, and that system 100 may be configured to perform additional or alternative functions as may serve a particular application.

In some examples, one or more components of system 100 and/or data to be used by system 100 may be implemented within an SDK that may be provided to or otherwise accessed by one or more software application developers. For example, an exemplary SDK may include one or more components of the development subsystem 110 and/or simulation subsystem 120. For instance, an SDK may include library data 585 for use by a developer.

An SDK may be provided to developers in the form of one or more executable electronic files. To illustrate, an SDK may be downloaded and installed or otherwise accessed by a computing device (e.g., a personal computer) used by a developer. Additionally or alternatively, an SDK may be accessed by a developer via network 210.

As mentioned, a user of development subsystem 110 may develop a software application for a particular type of processing device 310 by including one or more libraries configured to expose APIs associated with the processing device 310 within the source code of the application. In some example, these libraries may be included within the source code of a software application by using a template file when creating a new project within programming facility 550. The template file may include pre-determined source code that includes or accesses libraries associated with the desired processing device 310.

At any suitable point during the source code development, the source code may be complied and provided to the simulation subsystem 120 (e.g., uploaded from development subsystem 110 to simulation subsystem 120), where it can be executed within a simulated environment of one or more processing devices 310. Simulation subsystem 120 may be configured to display one or more GUIs configured to facilitate such simulation.

Figure 7:
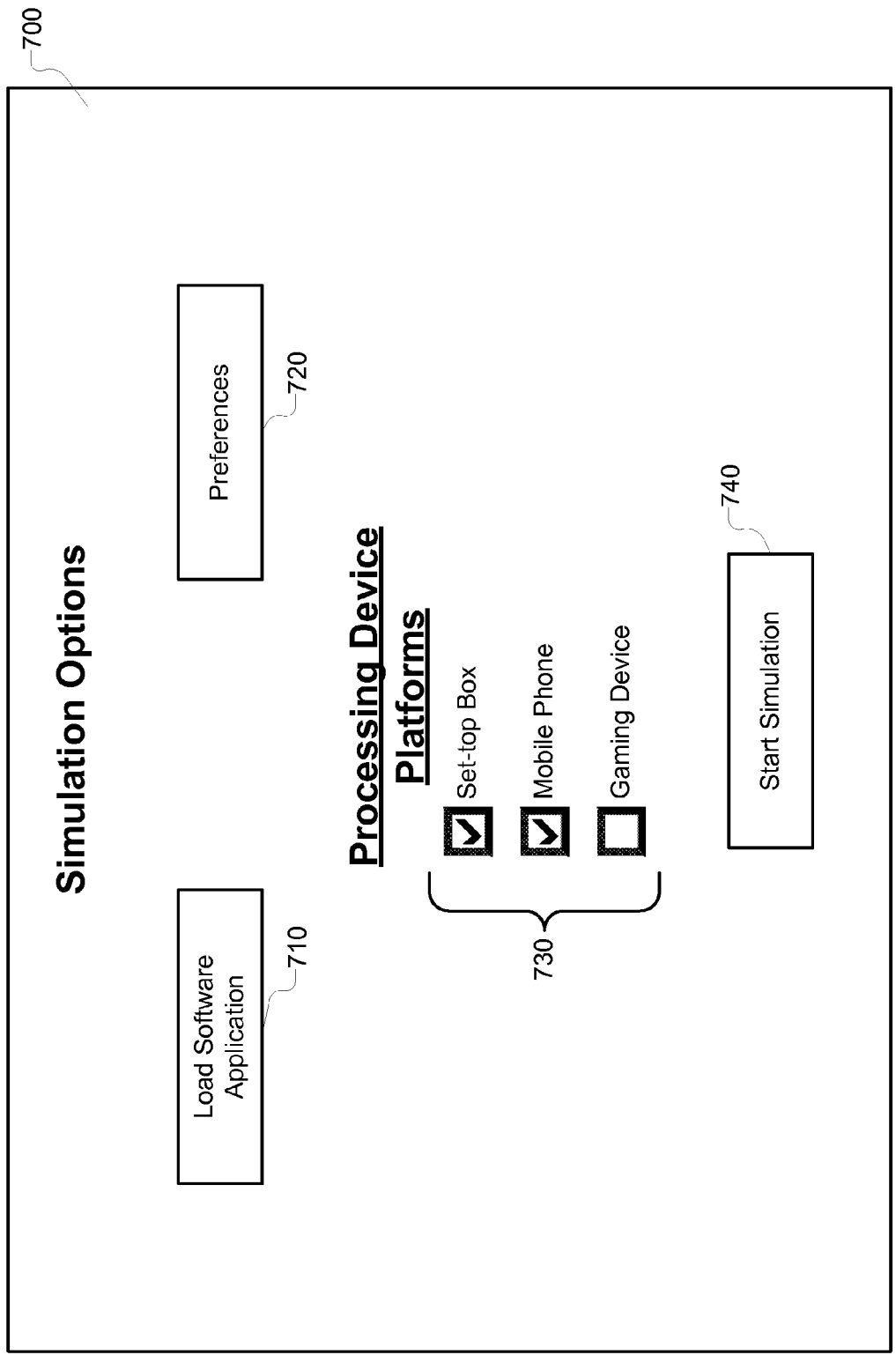
FIG. 7 illustrates an exemplary graphical user interface ("GUI") that may be displayed by simulation subsystem and that is configured to provide a user with one or more selectable options corresponding to a simulation of a software application according to principles described herein.

For example, FIG. 7 illustrates an exemplary GUI 700 that may be displayed by simulation subsystem 120 and that is configured to provide a user with one or more selectable options corresponding to a simulation of a software application. It will be recognized that the options shown in GUI 700 are merely illustrative and that additional or alternative options may be included as may serve a particular application.

As shown in FIG. 7, a user may select option 710 to load compiled source code representing a particular software application into the simulator facility 660. The compiled source code may be loaded into the simulator facility 660 in any suitable manner.

Option 720 may be selected to configure one or more simulation preferences. Such simulation preferences may include, but are not limited to, debugging preferences, input preferences, output preferences, reporting preferences, interface preferences, display preferences, etc.

As shown in FIG. 7, a user may select one or more processing device platforms 730 within which the software application will be simulated. Each processing device platform 730 corresponds to a particular type of processing device 310. For example, the processing device platforms 730 shown in FIG. 7 include a set-top box platform, a mobile phone platform, and a gaming device platform. Other processing device platforms 730 corresponding to other types of processing devices 310 may additionally or alternatively be included within GUI 700 as may serve a particular application.

When a particular processing device platform 730 is selected, simulation subsystem 120 may be configured to simulate execution of a software application by one or more processing devices 310 associated with the selected platforms. For example, a set-top box platform and a mobile phone platform are selected in GUI 700. In this configuration, when the user selects option 740 to begin simulation, simulation subsystem 120 may simulate execution of the software application by a set-top box and mobile phone. In certain embodiments, the simulated execution of the software application by a set-top box and mobile phone may be performed concurrently by simulation subsystem 120.

To facilitate simulation of a software application as executed by a particular processing device 310, simulation subsystem 120 may be configured to emulate the processing device 310 by operating in accordance with the device's APIs.

In this manner, the simulation subsystem 120 may emulate an environment, display, operation, function, and/or any other feature of the processing device 310 as the software application is executed by the simulation subsystem 120.

In some examples, one or more components of the simulation subsystem 120 (e.g., the emulator facility 650) may be configured to generate and display a graphical representation of a display screen associated with a processing device 310. Graphical content generated by the software application being simulated may be displayed within the graphical representation of the display. In this manner, a developer may see how the graphics associated with the software application would be rendered and displayed by the processing device 310.

Figure 8:
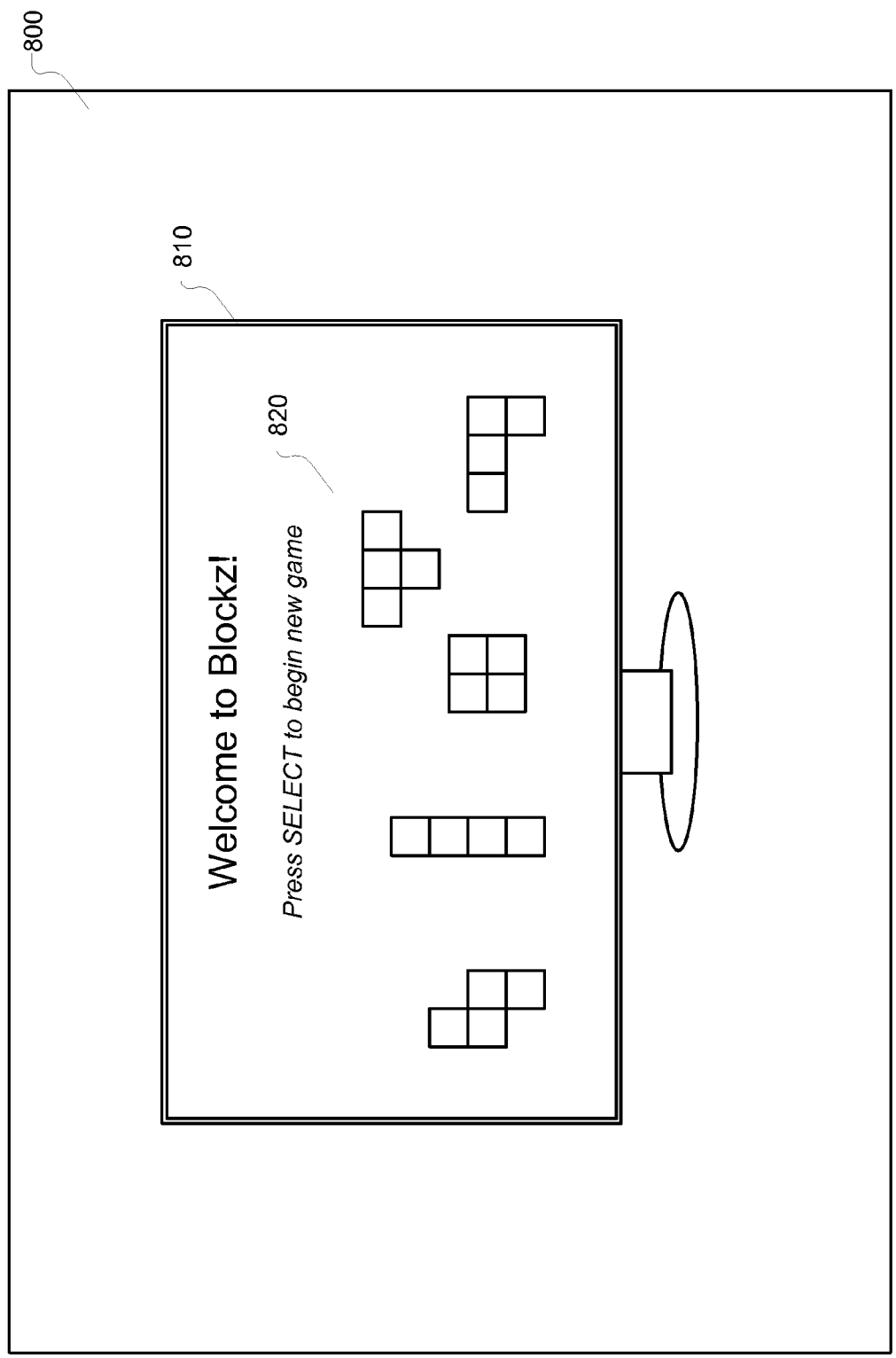
FIG. 8 shows an exemplary GUI that may be configured to display a graphical representation of a display screen associated with a set-top box according to principles described herein.

To illustrate, FIG. 8 shows an exemplary GUI 800 that may be generated by emulator facility 650 and configured to display a graphical representation of a display screen 810 associated with a set-top box. As shown in FIG. 8, the display screen 810 may be representative of a television screen, monitor, or other display associated with a set-top box. The display screen 810 may alternatively be associated with any other type of processing device 310.

In the example of FIG. 8, graphical content 820 associated with a software application being simulated by simulation subsystem 120 is displayed within the graphical representation of the display screen 810. The graphical content 820 may be updated as the software application is executed for the simulation. In this manner, a developer may see how graphical content 820 would be actually rendered and displayed by the processing device 310 being emulated and note any bugs or other display problems that may occur.

The software application being simulated in FIG. 8 is a game application entitled "Blockz." While game applications are used in connection with the examples given herein, it will be recognized that any type of software application may additionally or alternatively be simulated by simulation subsystem 120.

Emulator facility 650 of simulation subsystem 120 may additionally or alternatively be configured to emulate other components or devices associated with a processing device 310 being simulated. For example, emulator facility 650 may emulate a user input device associated with a processing device 310. In this manner, user input commands received during execution of a software application may be simulated.

Figure 9:
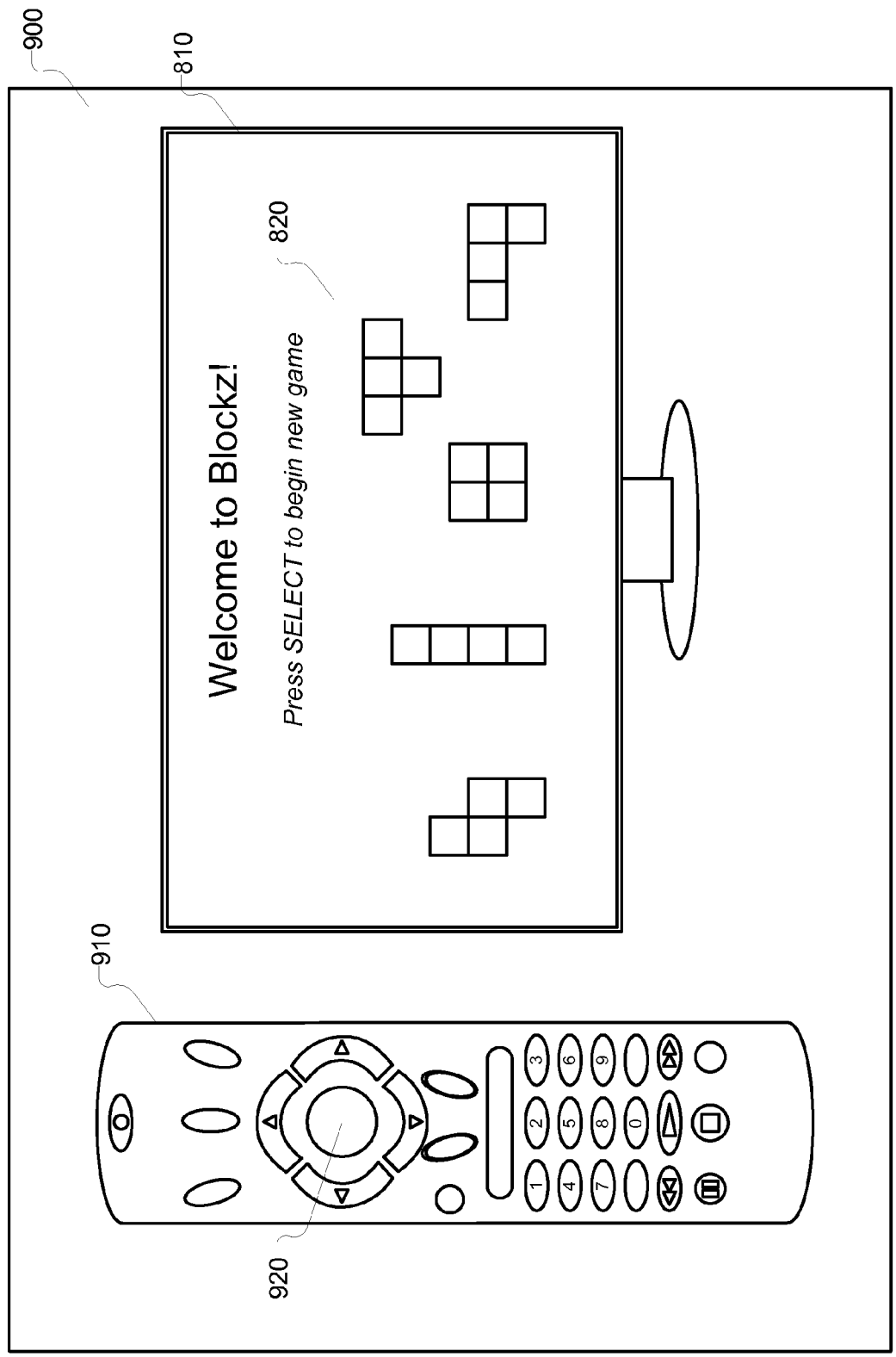
FIG. 9 shows an exemplary GUI that may be configured to display a graphical representation of a display screen and a remote control user input device associated with a set-top box according to principles described herein.

To illustrate, FIG. 9 shows an exemplary GUI 900 that may be generated by emulator facility 650 and configured to display a graphical representation of a remote control user input device 910 associated with a set-top box. The graphical representation of the display screen 810 associated with the set-top box may also be displayed within GUI 900, as shown in FIG. 9.

In some examples, a user may select a graphical representation of an input device key (e.g., key 920) or other input mechanism that is a part of the user input device 910 (e.g., with a mouse pointer) to simulate a user input command associated with that key. Additionally or alternatively, one or more of the input device keys may be mapped to keyboard shortcuts keys, which may alternatively be used to generate user input commands associated with the input device keys. To illustrate, Table 1 shows an exemplary mapping of input device keys to keyboard shortcut keys. The mapping shown in Table 1 is merely illustrative of one of many different mappings that may be used in accordance with the systems and methods described herein.

TABLE 1

| Input Device Key | Keyboard Shortcut Key |
|---|---|
| Power | Scroll lock |
| Channel up/Page up | Num pad 9 |
| Channel down/Page down | Num pad 3 |
| Up | Up arrow/Num pad 8 |
| Down | Down arrow/Num pad 2 |
| Left | Left arrow/Num pad 4 |
| Right | Right arrow/Num pad 6 |
| OK | Enter/Space/Num pad 5 |
| Menu | Apps/Right click key |
| Volume up | End/Num pad 7 |
| Volume down | Home |
| Channel up | Add/+ |
| Channel down | Subtract/− |
| A | A |
| B | B |
| C | C |
| Key (0-9) | 0-9 |
| Help | F1 |
| Exit | Esc |
| Info | F10 |
| Guide | F2 |
| Stop | F8 |
| Pause | F6 |
| Play | F5 |
| FAV | F |

In some examples, a user of simulation subsystem 120 may input one or more user input commands to interact with a software application being simulated. For example, if the software application is a game application, the user may input user input commands to play or otherwise test the game. In this manner, various levels, features, and/or scenarios of the game application may be simulated.

Additionally or alternatively, one or more pre-scripted command files may be created to simulate an interaction of one or more user input commands with a software application. For example, a pre-scripted command file containing a series of user input commands configured to interact with a game application may be created to test one or more levels, features, and/or scenarios of the game application. The pre-scripted command files may be created using any suitable programming facility or application.

As mentioned, simulation subsystem 120 may be configured to selectively simulate execution of a software application within multiple processing device platforms each corresponding to a distinct type of processing device 310. To this end, simulation subsystem 120 may be configured to operate in accordance with each of the APIs associated with the multiple processing device platforms. It will be recognized that some APIs may be common to each of the processing device platforms while other APIs may be specific to one or more of the processing device platforms.

To facilitate simulation of a software application within multiple processing device platforms, simulation subsystem 120 may be configured to generate and display graphical representations of display screens associated with each of the multiple processing device platforms. Two or more of the graphical representations of display screens may be displayed concurrently by simulation subsystem 120 so that a developer may readily compare how graphics are rendered and displayed by different types of processing devices 310.

Figure 10:
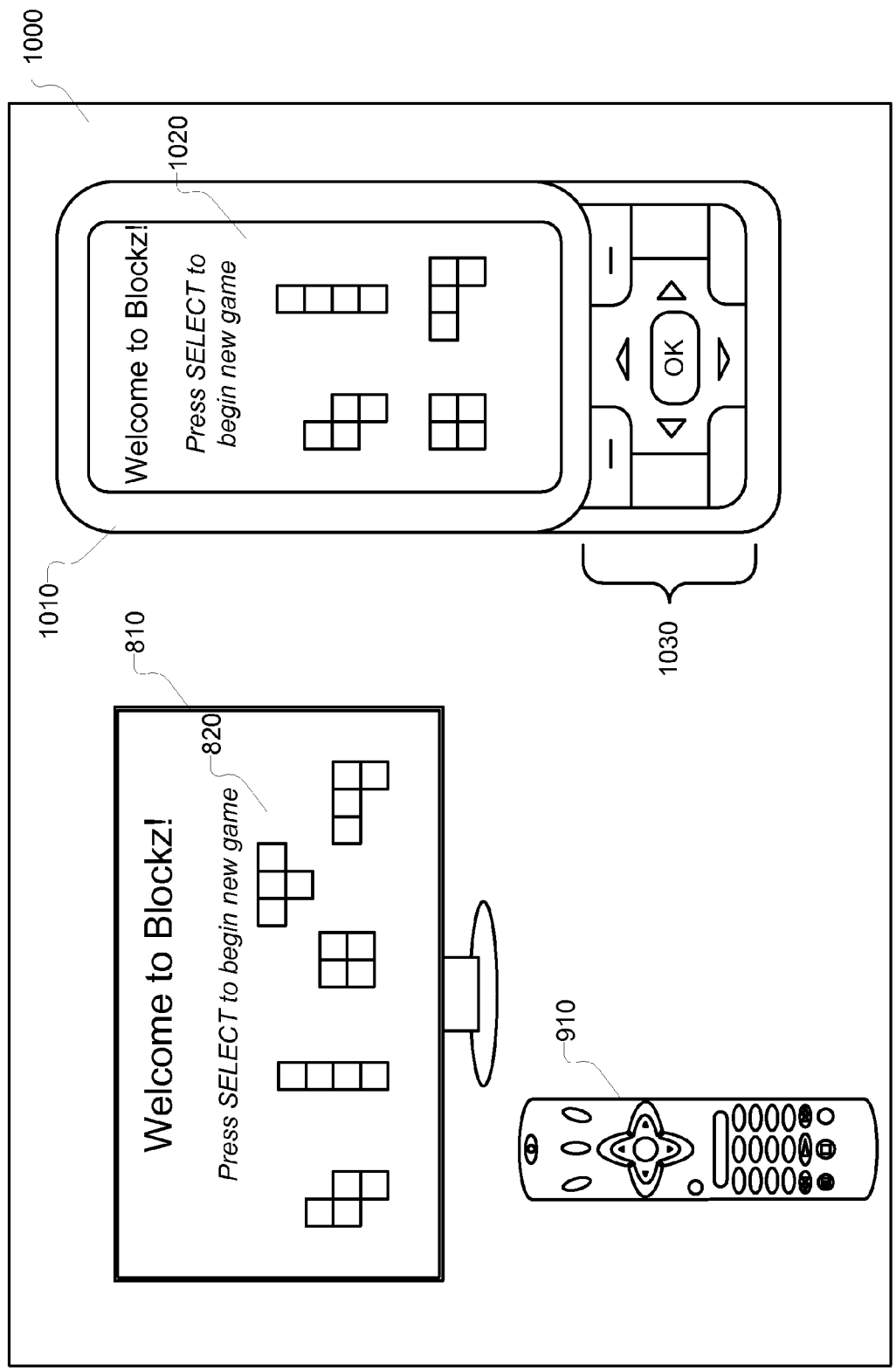
FIG. 10 shows a GUI configured to simultaneously display graphical representations of display screens associated with two different types of processing devices according to principles described herein.

For example, FIG. 10 shows a GUI 1000 configured to concurrently display graphical representations of display screens associated with two different types of processing devices 310. As shown in FIG. 10, the GUI 1000 may include a graphical representation of a display screen 810 associated with a set-top box and a graphical representation of a display screen 1010 associated with a mobile phone. Graphical content 820 and 1020 associated with a software application being simulated by simulation subsystem 120 may be concurrently displayed and updated within display screens 810 and 1010 as the software application is executed. In this manner, a developer may note differences in how the graphical content 820 and 1020 would be rendered and displayed by the two processing devices 310.

Additionally or alternatively, user input commands may be concurrently simulated within multiple processing device platforms. To this end, GUI 1000 may further be configured to concurrently display graphical representations of user input devices associated with each of the processing devices 310 being simulated by simulation subsystem 120. For example, GUI 1000 may be configured to concurrently display a graphical representation of a remote control user input device 910 associated with the set-top box and a graphical representation of a user input device 1030 associated with the mobile phone.

To facilitate concurrent simulation of user input commands within distinct processing device platforms, the user input commands may be mapped to native input commands corresponding to each of the processing device platforms. For example, a particular set of user input commands may be mapped to native input commands corresponding to a set-top box and to native input commands corresponding to a mobile phone. In this manner, when user input commands are presented to simulation subsystem 120, multiple sets of native input commands each corresponding to one of the processing device platforms being simulated are generated. Interaction of the native input commands with the software application being simulated within each processing device platform may then observed by a developer.

In some examples, simulation subsystem 120 may be used to debug a software application. To this end, simulation subsystem 120 may be configured to operate in accordance with one or more debugging tools provided by development subsystem 110. For example, one or more breakpoints may be inserted into source code representing a particular software application. As the software application is simulated, one or more variables within the source code may be watched or monitored as execution of the source code is paused at each of the breakpoints. Additional or alternative debugging functions may be performed by development subsystem 110 and/or simulation subsystem 120 as may serve a particular application.

In some examples, a software application developed with development subsystem 110 and simulated with simulation subsystem 120 may be transmitted to or downloaded by a processing device 310 where it may be executed. The software application may be downloaded directly from simulation subsystem 120, development subsystem 110, and/or another suitable location (e.g., a server). In some examples, the same compiled source code that is used by simulation subsystem 120 may be downloaded to one or more processing devices 310 for execution.

Alternatively, compiler facility 560 may be configured to cross compile source code for execution by the simulation subsystem 120 and one or more processing devices 310. In such instances, multiple versions of compiled source code are generated. For example, one version of compiled source code may be generated for execution by the simulation subsystem 120 while one or more other versions of compiled source code may be generated for execution by the one or more processing devices 310.

It will be recognized that computing and display capabilities may vary from one type of processing device 310 to another. Hence, in instances where it is desirable for a software application to be executed by distinct types of processing devices 310, source code corresponding to the software application may be customized for each type of processing device 310.

Figure 11:
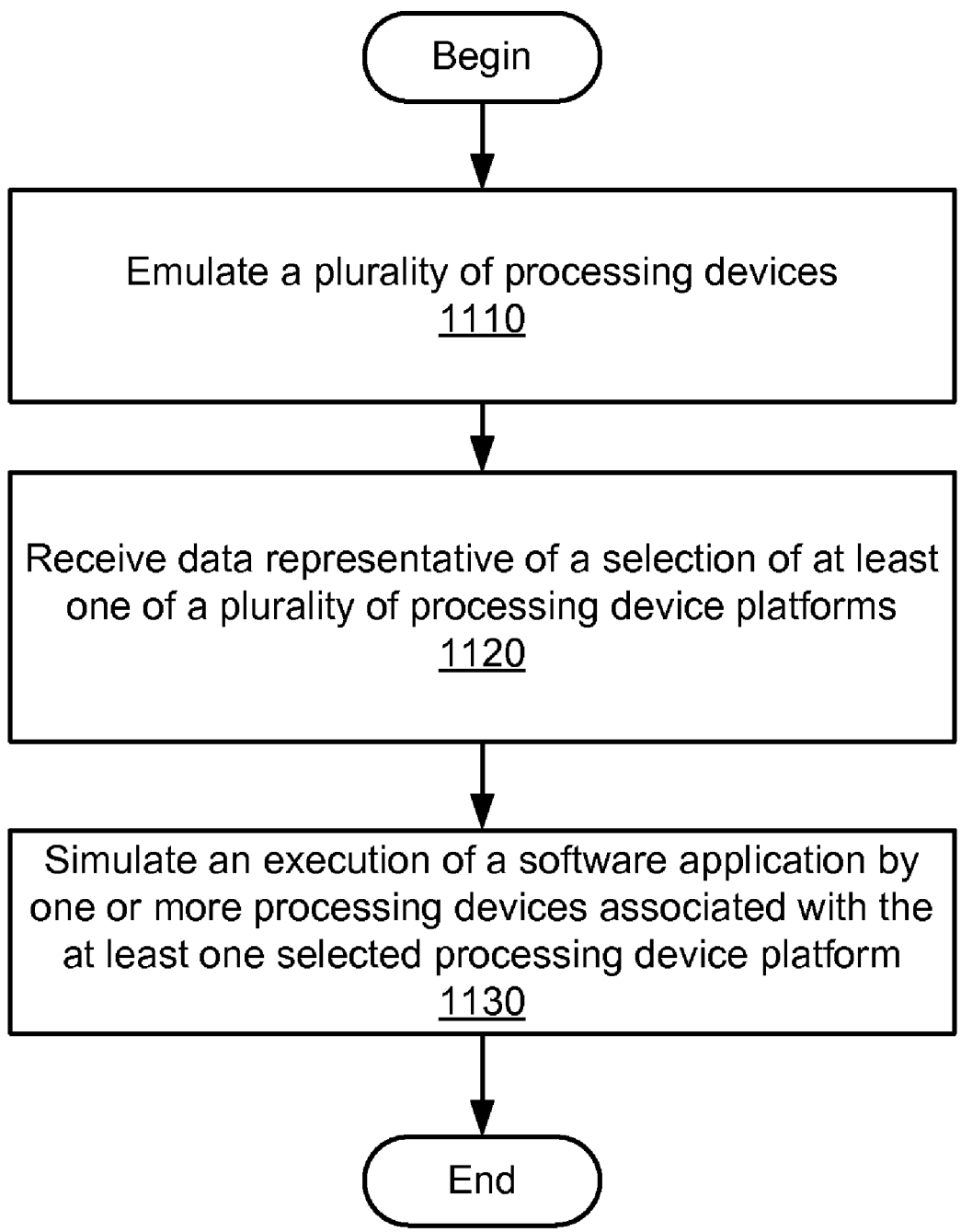
FIG. 11 illustrates an exemplary method of simulating an execution of a software application by one or more processing devices associated with one or more processing device platforms according to principles described herein.

FIG. 11 illustrates an exemplary method of simulating an execution of a software application by one or more processing devices associated with one or more processing device platforms. While FIG. 11 illustrates exemplary steps according to one embodiment, other embodiments may omit, add to, reorder, and/or modify any of the steps shown in FIG. 11.

In step 1110, a plurality of processing devices is emulated. The processing devices may be emulated in any of the ways described herein.

In step 1120, data representative of a selection of at least one of a plurality of processing device platforms is received. The data may be in the form of one or more user input commands, for example, and may be received in any of the ways described herein.

In step 1130, an execution of a software application by one or more processing devices associated with the at least one selected processing device platform is simulated. The simulation may be performed in any of the ways described herein.

FIG. 12 illustrates an exemplary method of simulating an execution of a software application within a plurality of processing device platforms. While FIG. 12 illustrates exemplary steps according to one embodiment, other embodiments may omit, add to, reorder, and/or modify any of the steps shown in FIG. 12.

In step 1210, a plurality of processing device platforms each associated with at least one type of processing device is emulated. The processing device platforms may be emulated in any of the ways described herein.

In step 1220, a graphical representation of a display screen corresponding to each of the processing device platforms is displayed. The graphical representations may be displayed in any of the ways described herein.

In step 1230, an execution of a software application within each of the processing device platforms is simulated by concurrently displaying graphical content generated by the software application within the graphical representations of the display screens. The graphical content may be generated and displayed in any of the ways described herein.

In step 1240, one or more user input commands are received. The user input commands may be input in any of the ways described herein.

In step 1250, the one or more user input commands are mapped to one or more native input commands corresponding to each of the types of processing devices. The mapping may be performed in any of the ways described herein.

In step 1260, the graphical content within the graphical representations of the display screens is concurrently updated in accordance with the one or more native input commands. The graphical content may be updated in any of the ways described herein.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A system comprising:
a storage facility configured to maintain compiled source code representative of a software application;
an emulator facility communicatively coupled to said storage facility and configured to emulate different processing device platforms; and
a simulator facility communicatively coupled to said storage facility and said emulator facility, and configured to concurrently simulate execution of said software application by different processing devices associated with said different processing device platforms using said emulator facility.

2. The system of claim 1, wherein said simulator facility is further configured to process data representative of a selection of a plurality of said different processing device platforms and concurrently simulate execution of said software application within said selected plurality of said different processing device platforms.

3. The system of claim 1, wherein said emulator facility is configured to generate and display a graphical representation of a plurality of display screens each associated with at least one of said different processing devices.

4. The system of claim 3, wherein said emulator facility is further configured to display graphical content generated by said software application within said graphical representation of said display screens.

5. The system of claim 4, wherein said emulator facility is further configured to update said graphical content in response to said execution of said software application.

6. The system of claim 1, further comprising a communication facility configured to transmit said software application to at least one of said different processing devices for execution by said at least one of said different processing devices.

7. The system of claim 1, wherein said simulator facility is further configured to facilitate debugging of said software application.

8. The system of claim 1, wherein said different processing devices are each associated with a single service provider.

9. A system comprising:
a development subsystem configured to facilitate development of a software application; and
a simulation subsystem selectively and communicatively coupled to said development subsystem, said simulation subsystem configured to
emulate different processing device platforms,
receive data representative of a selection of a plurality of said different emulated processing device platforms, and
concurrently simulate execution of said software application by different processing devices associated with said selected plurality of said different emulated processing device platforms.

10. The system of claim 9, wherein said simulation subsystem is further configured to display a graphical representation of a plurality of display screens associated with said different processing devices.

11. The system of claim 10, wherein said simulation subsystem is further configured to display graphical content generated by said software application within said graphical representation of said display screens.

12. The system of claim 11, wherein said simulation subsystem is further configured to update said graphical content in response to said execution of said software application.

13. The system of claim 9, wherein said development subsystem is configured to cross compile source code representative of said software application for execution by said simulation subsystem and said different processing devices.

14. The system of claim 13, wherein at least one of said development subsystem and said simulation subsystem is further configured to transmit said cross compiled source code to at least one of said different processing devices.

15. The system of claim 9, wherein said simulation subsystem is further configured to operate in accordance with at least one application program interface associated with said different processing devices.

16. The system of claim 9, wherein said development subsystem is configured to expose one or more application program interfaces of said different processing devices.

17. The system of claim 9, wherein said simulation subsystem is further configured to facilitate debugging of said software application.

18. A method comprising:
emulating different processing device platforms;
receiving data representative of a selection of a plurality of said different processing device platforms; and
concurrently simulating execution of a software application by different processing devices associated with said selected plurality of said different processing device platforms.

19. The method of claim 18, further comprising displaying a graphical representation of a plurality of display screens associated with said selected plurality of said different processing devices.

20. The method of claim 19, further comprising displaying and updating graphical content generated by said software application within said graphical representation of said display screens in response to said execution of said software application.

21. A method comprising:
emulating a plurality of different processing device platforms each associated with a different type of processing device;
displaying a graphical representation of a plurality of display screens each corresponding to a different processing device platform;
concurrently simulating execution of a software application within each of said emulated processing device platforms, said concurrently simulating including concurrently displaying graphical content generated by said software application within said graphical representations of said display screens;
receiving one or more user input commands;
mapping said one or more user input commands to one or more native input commands corresponding to each of said different types of processing devices; and
concurrently updating said graphical content within said graphical representations of said display screens in accordance with said one or more native input commands.

22. A non-transitory computer-readable medium including instructions configured to direct a computer to:
receive data representative of a selection of a plurality of different processing device platforms; and
concurrently simulate execution of a software application by different processing devices associated with said selected plurality of different processing device platforms.

23. The non-transitory computer-readable medium of claim 22, wherein said instructions are further configured to direct said computer to emulate said selected plurality of said different processing device platforms.

24. The non-transitory computer-readable medium of claim 22, wherein said instructions are further configured to direct said computer to generate and display a graphical representation of a plurality of display screens associated with said plurality of said different processing devices.

* * * * *